Aug. 3, 1965      I. NEUSTADTER      3,197,867

RESTORATION TOOTH AND TOOTH UNIT

Filed Dec. 1, 1961

INVENTOR
IRVING NEUSTADTER

BY Harry Cole

ATTORNEY

United States Patent Office 3,197,867
Patented Aug. 3, 1965

3,197,867
RESTORATION TOOTH AND TOOTH UNIT
Irving Neustadter, 246 Bay 19th St., Brooklyn, N.Y.
Filed Dec. 1, 1961, Ser. No. 156,310
11 Claims. (Cl. 32—10)

This invention relates to dental restorations and, more particularly, to a restoration tooth and artificial tooth unit.

One of the objects of the present invention is the provision of a restoration tooth which has a portion of increased thickness for securing the tooth to a backing member whereby the tooth of the resulting artificial tooth unit is of increased strength.

A further object is the provision of an artificial tooth unit which may be prefabricated and which is ready to be used by the dentist with little or no additional fabrication.

A further object is to provide an artificial tooth unit consisting of a restoration tooth and backing member which permits grinding of parts of the tooth and backing member without impairing the mating relation between the tooth and its backing member.

A further object is to provide a restoration tooth and tooth unit of generally improved construction and design.

The above and other objects, features and advantages of the invention will be more fully understood from the following description of the invention considered in connection with the accompanying drawings which are illustrative of the preferred embodiment of the invention but not in limitation thereof.

Figure 1:
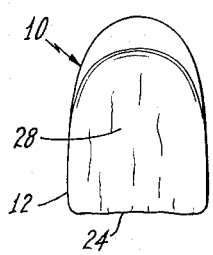
FIG. 1 is a view of the front of an artificial tooth unit for an upper anterior tooth in accordance with the present invention.
Figure 2:
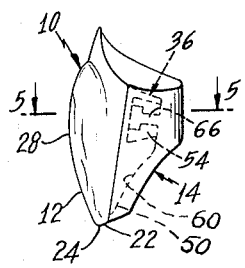
FIG. 2 is a view of a side of the tooth unit.
Figure 3:
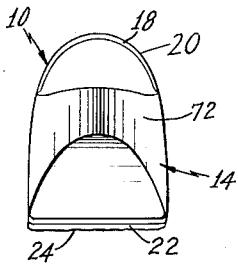
FIG. 3 is a view of the back of the tooth unit.
Figure 4:
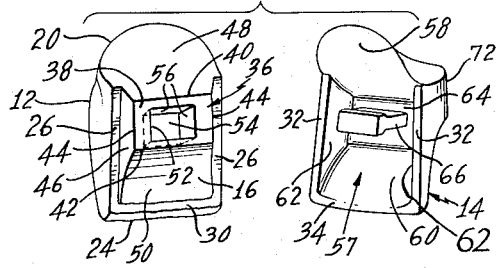
FIG. 4 is an exploded perspective view of the companion parts of the tooth unit.

Referring now to the drawings in detail, the tooth unit 10, here shown as an upper incisor tooth, comprises a restoration tooth 12, which is in the form of a tooth-shaped body, and a backing member 14 which is secured to said body at its lingual side 16 and covers said side except for the exposed part 18 at the gingival edge 20 of the tooth and the exposed part 22 at the incisal edge 24 of the tooth. The tooth 12 can be made of any artificial tooth simulating material, for example porcelain or plastic and the backing member 14 can be made from any suitable metal.

Tooth 12 is formed with shoulders 26 positioned at the opposite marginal edges of the lingual side 16 of the tooth, remote from the labial side 28 of the tooth, and said shoulders are laterally spaced from each other in a mesial and distal direction. Each of the shoulders extends in a gingival to incisal direction and laterally in a mesial and distal direction. A horizontal shoulder 30 extends along the incisal edge 24 of the tooth at the lingual side thereof from the end of one shoulder 26 to the end of the other shoulder 26 adjacent the incisal edge of the tooth. Shoulders 26 and shoulder 30 provide abutting surfaces for the companion interfitting edges 32 and 34 of the backing member 14. Edges 32 of the backing member abut and interfit with the shoulders 26 and edge 34 abuts and interfits with the shoulder 30. Tooth 12 has a built-up part 36 positioned between the laterally spaced shoulders 26 and extends therefrom in a lingual direction and terminates in a planar surface 38 which is spaced inwardly from shoulders 26. The peripheral shape of surface 36 is generally rectangular and the upper edge 40 of the surface is spaced from the gingival edge 20 of the tooth and the lower edge 42 of the surface is spaced from the incisal edge 24 of the tooth. The side edges 44 of surface 38 are connected to shoulders 26 by surface portions 46 which converge inwardly or in a lingual direction. Edge 40 is connected to the gingival edge 20 of the tooth by the gingival surface 48 and edge 42 of surface 38 is connected to shoulder 30 by the lingual surface 50 which converges from edge 42 toward the incisal edge of the tooth.

A recess 54 is provided in part 36 and extends to surface 38, where it terminates at the opening 52 in said surface. The side walls 56 of the recess converge in a labial to lingual direction. Built-up part 36 provides a thickened portion for the tooth in a labial to lingual direction and thereby strengthens the tooth and, as hereinafter described, a projection on the backing member 14 extends into recess 54 and is secured in said recess by porcelain or other suitable cementitious material which, upon hardening is said recess, becomes an integral portion of said part 36 and provides a strong tooth body and reinforced securement of the tooth 12 and its backing member 14.

Figure 5:
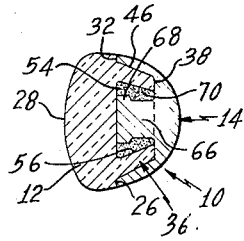
FIG. 5 is a horizontal sectional view taken on line 5—5 of FIG. 2.

The backing member 14 has a recess 57 in which the lingual part of tooth 12 extends. The recess is defined by internal wall surfaces which are adapted to abut and interfit with the companion surfaces of the tooth 12 at the lingual side thereof. As indicated previously, edges 32 abut and interfit shoulder 26 of the tooth and edge 34 abuts and interfits shoulder 30 of the tooth. Edges 32 form the lateral boundaries of recess 57 and edge 34 forms the lower boundary of the recess. Internal surface 58 of the backing member abuts and interfits with the gingival surface 48 of the tooth and internal surface 60 of the backing member abuts and interfits with the lingual surface 50 of the tooth. Laterally spaced internal surfaces 62 abut and interfit the companion surfaces 46 of the tooth and planar internal surface 64 of the backing member, which forms the bottom of the recess, abuts and interfits with the planar surface 38 of the tooth. Said backing member is provided with an integral pin 66 in recess 57. Pin 66 projects from surface 64 and is adapted to extend into recess 54 of the tooth for securing the backing member and the tooth together. As herein shown, pin 66 is rectangular in cross section, although it will be understood that the cross section can be of any configuration, and has an enlarged part or button 68 (FIG. 5) at its free end which is slightly smaller than opening 52 so the pin can extend through the opening into recess 54. The sides of the pin are parallel.

In securing the backing member to the tooth, recess 54 is filled with a suitable cement 70 and the backing member is placed on the lingual side of the tooth with pin 66 extending into the recess. The converging surfaces 46 of the tooth 12 and the converging complementary surfaces 62 of the backing member 14 facilitate the mounting of the backing member on the tooth. When the cement hardens, it locks the pin 66 in the recess and securely connects the tooth 12 and backing member 14 to each other in complementary tooth-unit defining relation. Thus, as indicated previously, the hardened cement 70 forms an integral part of the tooth as well as joining the backing member to the tooth so that, in effect, a unitary integral structure of the tooth and backing member results, whereby a strong artificial tooth unit 10 is formed. The resulting strengthened tooth permits the backing member 14 to be made of a suitable material which can be relatively light in gage since the strength of the artificial tooth unit is not primarily dependent on the strength of the backing member but, on the contrary, derives its strength mainly from the strong tooth which is formed due to the provision of the built-up reinforcing part 36 of the tooth.

The outer surfaces 72 of the backing member 14 have a shape which conforms in general to the anatomy of the natural tooth so that the artificial tooth unit 10 resembles to a great degree a natural tooth. Said backing member, however, cannot be seen from the front of the unit. It is to be noted that the planar surface 38 is remote from the gingival edge 20 of the tooth and this is also true of the companion surfaces 64 of the backing member so that the dentist is free to grind the marginal edge of the gingival surface 48 of the tooth and the corresponding marginal edge of the complementary surface portion of the backing member 14 to properly fit the unit to the patient's gum without interfering with the mating relation between the tooth 12 and the backing member 14.

Figure 6:
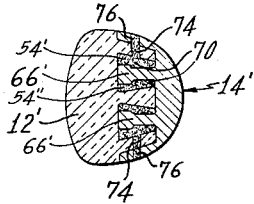

While the invention as just described includes provision for one recess 54 only, it will be understood, as seen in FIG. 6, that more than one recess can be provided, as for example the two recesses 54' and 54" provided in the restoration tooth 12' and, similarly, the backing member 14' is provided with corresponding pins 66' and 66". The sides of the restoration tooth and backing member can be provided with registering openings 74 and 76, respectively, which are filled with cement 70 which, upon hardening, forms pins which aid in the retention of the backing member on the restoration tooth.

Figure 7:
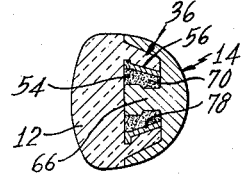
FIGS. 6 and 7 are views similar to FIG. 5 showing other forms of the invention.

As shown in FIG. 7, recess 54 can be provided with a sleeve 78 whose sides converge inwardly in a labial to lingual direction. Of course, it will be understood that it is within the scope of the invention to provide a sleeve for each recess and the cross section of the sleeve will conform to the cross section of the recess which can be rectangular, square or circular or any other desired configuration.

Figure 8:
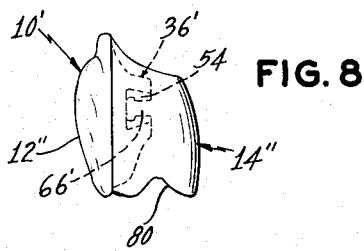
FIG. 8 is a view of the side of an artificial tooth unit for an artificial bicuspid tooth in accordance with the invention.

It will be understood that the invention is applicable to all upper and lower tooth restorations including anterior and posterior teeth. An artificial tooth unit 10' for a posterior tooth, here shown as a biscuspid tooth, is illustrated in FIG. 8, and it will be noted that due to the provision of the relatively thick built-up portion 36', the backing member 14" for the unit is relatively deep and includes an occlusal surface part 80 for the tooth. The backing member is secured to the restoration tooth 12" in the same manner as previously described.

While I have shown and described the preferred embodiment of my invention, it will be understood that the invention may be embodied otherwise than as herein specifically illustrated or described and that certain changes in the form and arrangement of parts and in the specific manner of practicing the invention may be made without departing from the underlying idea or principles of this invention within the scope of the appended claims.

I claim:
1. A restoration tooth, comprising:
    (a) a tooth-shaped body adapted to interfit with a complementary backing member,
    (b) said body having shoulders at its lingual side laterally spaced from each other in a mesial and distal direction,
    (c) each of said shoulders extending from the gingival edge of said body to the incisal edge of said body,
    (d) another shoulder extending along the incisal edge of said body at the lingual side thereof laterally in a mesial and distal direction, and
    (e) a part positioned between said laterally spaced shoulders and having a recess open at the lingual side of said body for receiving a companion part of said backing member for the securement of said body to said member.

2. A tooth unit, comprising: a tooth-shaped, restoration tooth body; a backing member for complementary interfitting with said body; said member including projecting means; said body including two shoulders at its lingual side laterally spaced from each other in a mesial and distal direction, each of said shoulders extending from the gingival edge of said body to the incisal edge of said body, another shoulder extending along said incisal edge of said body at said lingual side thereof laterally in a mesial and distal direction, and a part positioned between said laterally spaced shoulders and having a recess therein open at said lingual side of said body receiving said projecting means of said backing member for the securement of said body to said member, said part having a surface spaced from said shoulders on said lingual side of said body and said recess extending from said surface toward said labial side of said body; said backing member also including a recessed surface which interfits with said body at said lingual side of said body above, below and at the opposite sides of said part of said body, and two laterally spaced shoulders which abut said laterally spaced shoulders, respectively of said body.

3. A tooth unit, comprising: a tooth-shaped, restoration tooth body; a backing member for complementary interfitting with said body; said member including projecting means; said body including two shoulders at its lingual side laterally spaced from each other in a mesial and distal direction, each of said shoulders extending from the gingival edge of said body to the incisal edge of said body, another shoulder extending along said incisal edge of said body at said lingual side thereof laterally in a mesial and distal direction, and a surface spaced from said shoulders on said lingual side of said body, and a recess extending from said surface toward said labial side of said body receiving said projecting means of said backing member for the securement of said body to said member; said backing member also including a recessed surface which interfits with said body at said lingual side of said body above, below and at the opposite sides of said part of said body, and two laterally spaced shoulders which abut said laterally spaced shoulders, respectively of said body.

4. A tooth unit, comprising: a tooth-shaped, restoration tooth body; a backing member for complementary interfitting with said body; said member including projecting means; said body including two shoulders at its lingual side laterally spaced from each other in a mesial and distal direction, each of said shoulders extending from the gingival edge of said body to the incisal edge of said body, another shoulder extending along said incisal edge of said body at said lingual side thereof laterally in a mesial and distal direction, and a surface spaced from said shoulders on said lingual side of said body, and a recess extending from said surface toward said labial side of said body, said recess having wall portions which converge in a labial toward lingual direction and receiving said projecting means of said backing member for the securement of said body to said member; said backing member also including a recessed surface which interfits with said body at said lingual side of said body above, below and at the opposite sides of said part of said body, and two laterally spaced shoulders which abut said laterally spaced shoulders, respectively of said body.

5. A tooth unit, comprising: a tooth-shaped, restoration tooth body; a backing member for complementary interfitting with said body; said member including projecting means; said body including two shoulders at its lingual side laterally spaced from each other in a mesial and distal direction, each of said shoulders extending from the gingival edge of said body to the incisal edge of said body, another shoulder extending along said incisal edge of said body at said lingual side thereof laterally in a mesial and distal direction, and a surface spaced from said shoulders on said lingual side of said body, and a recess extending from said surface toward said labial side of said body, said recess having wall portions which converge in a labial toward lingual direction and receiving said projecting means of said backing member for the securement of said body to said member, and two laterally spaced edge portions extending from said two laterally spaced shoulders in a labial towards lingual direction to said surface; said backing member also including a recessed surface which interfits with said body at said lingual side of said body above, below and at the opposite sides of said part of said body, and two laterally spaced shoulders which abut said laterally spaced shoulders, respectively of said body.

6. A tooth unit, comprising: a tooth-shaped restoration tooth body; a backing member for complementary interfitting with said body; said member including projecting means; said body including two shoulders at its lingual side laterally spaced from each other in a mesial and distal direction, each of said shoulders extending from the gingival edge of said body to the incisal edge of said body, another shoulder extending along said incisal edge of said body at said lingual side thereof laterally in a mesial and distal direction, and a planar surface spaced from said shoulders on the lingual side of said body, and a recess extending from said surface toward said labial side of said body receiving said projecting means of said backing member for the securement of said body to said member; said backing member also including a recessed surface which interfits with said body at said lingual side of said body above, below and at the opposite sides of said part of said body, and two laterally spaced shoulders which abut said laterally spaced shoulders, respectively of said body.

7. A tooth unit, comprising: a tooth-shaped, restoration tooth body; a backing member for complementary interfitting with said body; said member including projecting means; said body including two shoulders at its lingual side laterally spaced from each other in a mesial and distal direction, each of said shoulders extending from the gingival edge of said body to the incisal edge of said body, another shoulder extending along said incisal edge of said body at said lingual side thereof laterally in a mesial and distal direction, and a surface spaced from said shoulders on said lingual side of said body, a recess extending from said surface toward said labial side of said body receiving said projecting means of said member for the securement of said body to said member, and two laterally spaced edge portions extending from said laterally spaced shoulders in a labial to lingual direction to said surface and converging toward each other in a labial toward lingual direction; said backing member also including a recessed surface which interfits with said body at said lingual side of said body above, below and at the opposite sides of said part of said body, and two laterally spaced shoulders which abut said laterally spaced shoulders, respectively of said body.

8. A tooth unit, comprising: a tooth-shaped, restoration tooth body; a backing member for complementary interfitting with said body; said member including projecting means; said body including two shoulders at its lingual side laterally spaced from each other in a mesial and distal direction, each of said shoulders extending from the gingival edge of said body to the incisal edge of said body, another shoulder extending along said incisal edge of said body at said lingual side thereof laterally in a mesial and distal direction, and a surface spaced from said shoulders on said lingual side of said body, a recess extending from said surface toward said labial side of said body receiving said projecting means of said member for the securement of said body to said member, two laterally spaced edge portions extending from said laterally spaced shoulders in a labial to lingual direction to said surface and converging toward each other in a labial toward lingual direction, and a sleeve disposed in said recess having wall portions converging toward each other in a labial to lingual direction and disposed between said body and said member; said backing member also including a recessed surface which interfits with said body at said lingual side of said body above, below and at the opposite sides of said part of said body, and two laterally spaced shoulders which abut said laterally spaced shoulders, respectively of said body.

9. A tooth unit, comprising: a tooth-shaped, restoration tooth body; a backing member for complementary interfitting with said body; said member including projecting means; said body including two shoulders at its lingual side laterally spaced from each other in a mesial and distal direction, each of said shoulders extending from the gingival edge of said body to the incisal edge of said body, another shoulder extending along said incisal edge of said body at said lingual side thereof laterally in a mesial and distal direction, and said body having a part positioned between said laterally spaced shoulders and extending therefrom on the lingual side of said body and terminating in a planar surface, a recess extending from said surface toward said labial side of said body receiving said projecting means of said member for the securement of said body to said member, and two laterally spaced edge portions extending from said laterally spaced shoulders in a labial toward lingual direction to said planar surface converging toward each other in a labial toward lingual direction; said backing member also including a recessed surface which interfits with said body at said lingual side of said body above, below and at the opposite sides of said part of said body, and two laterally spaced shoulders which abut said laterally spaced shoulders, respectively of said body.

10. A tooth unit, comprising: a tooth-shaped, restoration tooth; a backing member for complementary interfitting with said tooth; said tooth including a labial to lingual surface at the extreme gingival end thereof, and a lingual surface having a recess therein; said member including a body portion having a recess for receiving the lingual side of said tooth, said recess being coextensive with said lingual side of said tooth and defined by internal surfaces having contours for abutting and interfitting with the companion surfaces of said tooth on the lingual side thereof, including said labial to lingual surface thereof, said body portion also including a plurality of surfaces laterally spaced from each other in a mesial toward distal direction and each extending in a gingival toward incisal direction forming the lateral boundaries of said recess, another surface extending along the lower edge of said recess in a mesial and distal direction from the lower end of one of said laterally spaced surfaces to the lower end of the other of said laterally spaced surfaces and forming the lower boundary of said recess, one of said internal surfaces forming the bottom of said recess, and a part extending from said bottom of said recess and extending into said recess in said tooth for securement thereto.

11. A tooth unit, comprising: a tooth-shaped, restoration tooth body; a backing member for complementary interfitting with said body; said member including projecting means; said body including two shoulders at its lingual side laterally spaced from each other in a mesial and distal direction, each of said shoulders extending from the gingival edge of said body to the incisal edge of said body, another shoulder extending along said incisal edge of said body at the lingual side thereof laterally in a mesial and distal direction, and a part positioned between said laterally spaced shoulders and having a recess therein open at said lingual side of said body receiving said projecting means of said backing member for the securement of said body to said member.

References Cited by the Examiner

UNITED STATES PATENTS

| | | | |
|---|---|---|---|
| 1,170,630 | 2/16 | Glenn | 32—10 |
| 1,218,078 | 3/17 | Goldman | 32—9 |
| 2,044,106 | 6/36 | Schwartz | 32—9 |
| 2,475,244 | 7/49 | Kaufmann | 32—9 |

RICHARD A. GAUDET, *Primary Examiner.*

ROBERT E. MORGAN, *Examiner.*